Figure 1:
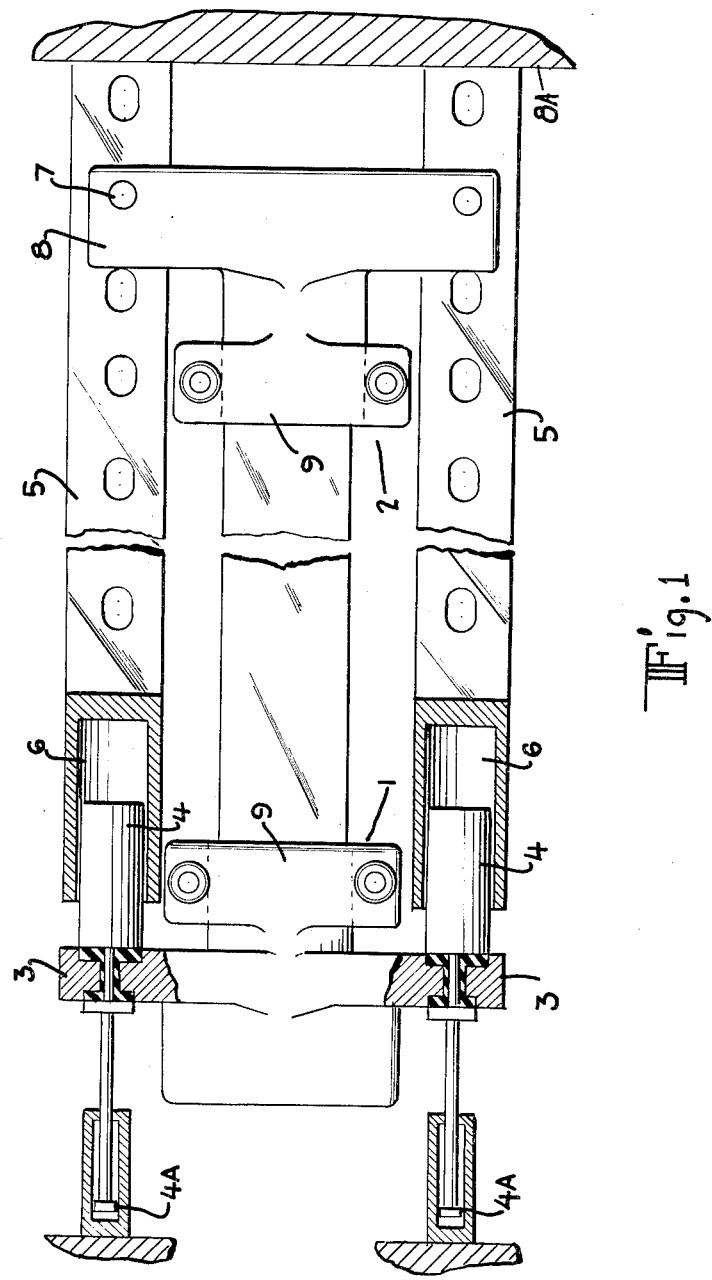

June 12, 1962 R. J. ELGER 3,038,520
GRIPPERHEAD FOR HYDRAULIC STRETCHING MACHINES
Filed Sept. 20, 1957 6 Sheets-Sheet 1

INVENTOR
Ronald John Elger
BY
ATTORNEYS

INVENTOR
Ronald John Elger

June 12, 1962 R. J. ELGER 3,038,520
GRIPPERHEAD FOR HYDRAULIC STRETCHING MACHINES
Filed Sept. 20, 1957 6 Sheets-Sheet 3
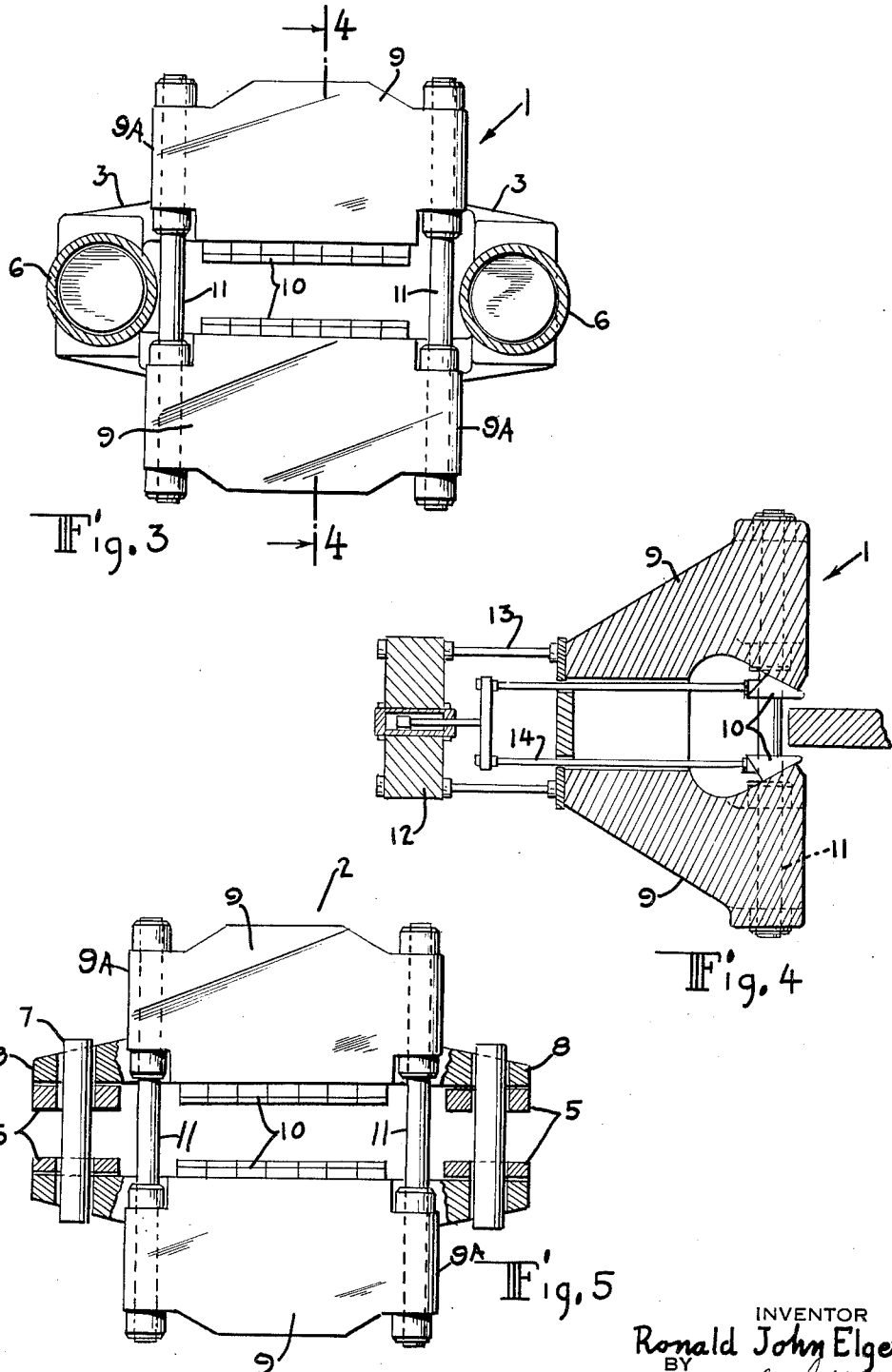
INVENTOR
Ronald John Elger
BY
Hammond
ATTORNEYS June 12, 1962   R. J. ELGER   3,038,520
GRIPPERHEAD FOR HYDRAULIC STRETCHING MACHINES
Filed Sept. 20, 1957   6 Sheets-Sheet 4

INVENTOR
Ronald John Elger
BY
Hammond
ATTORNEYS

June 12, 1962  R. J. ELGER  3,038,520
GRIPPERHEAD FOR HYDRAULIC STRETCHING MACHINES
Filed Sept. 20, 1957  6 Sheets-Sheet 5

INVENTOR
Ronald John Elger
BY
Hammond & Littell
ATTORNEYS

United States Patent Office 3,038,520
Patented June 12, 1962

3,038,520
GRIPPERHEAD FOR HYDRAULIC STRETCHING MACHINES
Ronald John Elger, Parkstone, Poole, England, assignor to The Loewy Engineering Company Limited, Bournemouth, England, a corporation of Great Britain
Filed Sept. 20, 1957, Ser. No. 685,131
Claims priority, application Great Britain Sept. 5, 1957
10 Claims. (Cl. 153—35)

This invention relates to hydraulic stretching machines for flat metal articles, such as plates and sheets, and, in particular, to the gripperheads of a hydraulic stretching machine. These machines comprise normally two gripperheads, each containing a pair of co-operating jaws which extend substantially across the width of the stretching machine and can engage the article to be stretched at opposite ends. Associated with one of the gripperheads is a hydraulic power unit which supplies the required stretching force to an article held between the gripping jaws while the other gripperhead is movable along the top part of the machine frame, but can be anchored to the frame at selected points during a stretching operation.

It is an essential requirement for these machines that an article to be stretched is firmly held by the gripping jaws across its entire width, while the stretching force is applied. Any failure in this respect results in non-uniform and inefficient stretching and can also lead to overloading of parts of the stretching machine, with consequent damage thereto. In order to ensure a uniform gripping action on the article to be stretched across its width, it has been proposed to sub-divide a jaw of a stretching machine into a number of sections which are arranged closely side by side in a gripperhead and movable independently of each other to that extent that each section can adapt itself to any unevenness in the thickness of the article to be stretched.

The gripping jaws are usually so mounted in their supporting structure that they can slide somewhat in the direction of the stretching force and that the grip on the article to be stretched increases with the stretching force applied. This has been accomplished by such means as wedge-shaped sections which co-operate with inclined bearing surfaces carried by the gripperhead. The greater the gripping force, the greater of course also its reactive force which tends to separate from each other the two co-operating jaws carried in a gripperhead. These separating forces act in the same plane as the gripping forces, viz., the vertical transverse plane through the two co-operating jaws. These forces can become very considerable and in the case of large and very large stretching machines be in the order of several thousand tons. They have to be resisted by the gripping jaw structure which carries the two co-operating jaws. This structure has to be made therefore sufficiently strong and heavy in order to remain free from excessive strains and deflections.

In conventional stretching machines, the structure carrying two co-operating jaws of a gripperhead was generally of substantially C-shaped configuration with the jaws being arranged at the ends of the overhanging or cantilever parts of the C so that they faced each other across the gap of the C. The article to be stretched was entered into this gap at one of its ends before stretching, whereupon the two jaws of the gripperhead were made effective to clamp the article from above and below respectively. The separating forces set up during a stretching operation were then transmitted to the connecting back part of the C-shaped structure. As this back part was at some distance from the plane of the separating forces bending moments were produced which tended to deflect outwardly the overhanging or cantilever parts of the C-shaped structure, whereby, if this actually occurred, the gap between the jaws would open to seriously impair the general efficiency and operation of the gripperhead.

These bending moments can become very large in cases where the stretching and hence the separating forces and also the depth of the gap of the C-shaped gripperhead, is large. In such cases the gripperhead would have to be exceptionally heavy in order to have the required stiffness. This applies especially to large and very large stretching machines wherein the stretching force is a thousand tons or more.

It is an object of the invention to provide a hydraulic stretching machine for flat metal articles in which the two co-operating jaws of a gripperhead are accommodated in and supported by a structure which obviates the afore-described disadvantages and shortcomings of the C-shaped structure.

It is another object of the invention to provide a hydraulic stretching machine for flat metal articles in which the separating forces set up during a stretching operation in the gripperhead structures are transmitted to structural elements which are located in the same transversal plane as the one in which the separating forces act, so that the afore-mentioned undesirable bending moments are avoided.

It is another object of the invention to provide a hydraulic stretching machine for flat metal articles in which bending moments in the vertical transversal planes of the jaws and deflections of the jaws due to such bending moments are considerably reduced.

According to the present invention, therefore, a gripperhead for a hydraulic stretching machine comprises a supporting structure for two co-operating gripping jaws constituted by two spaced apart crossbeam units, one for each gripping jaw, said crossbeam units and said jaws being arranged in superposed relationship, and said crossbeam units extending across the width of the jaws and therebeyond so that they project with their ends beyond the ends of the jaws, and tie-rods extending between and firmly connecting corresponding ends of the two crossbeam units, so that the crossbeam units and the tie-rods form together a closed rectangular frame structure in which the jaws are accommodated.

The frame structure is then situated substantially in the plane of the separating forces acting on the two jaws of a pair so that the bending moments are eliminated the frame forming a self-contained structure for taking these forces.

According to a further feature of the invention, a gripperhead for a hydraulic stretching machine and the like comprises a supporting structure for two co-operating gripping jaws constituted by two spaced apart crossbeam units, the inner adjacent faces of the crossbeam units each co-operating with the inclined surfaces of a series of wedge-like jaw sections constituting each gripping jaw, said crossbeam units and said jaws being arranged in superposed relationship, and said crossbeam units extending across the width of the jaws and therebeyond so that they project with their ends beyond the ends of the jaws, and tie-rods extending between and connecting corresponding ends of the two cross-beam units so that the cross-beam units and the tie-rods form together a closed rectanguar frame structure in which the jaws are accommodated.

Preferably, each crossbeam unit is constituted by an inner and an outer crossbeam member arranged in superposed relationship and making contact with one another at two spaced points equi-distant from the middle of the unit, the tie-rods extending between and being anchored to the outer crossbeam members only, while the inner crossbeam members are supported on longitudinal frame members.

It is, however, possible to form each crossbeam unit as a single member if desired, in which case this member is attached to the longitudinal members of the frame.

Figure 2:
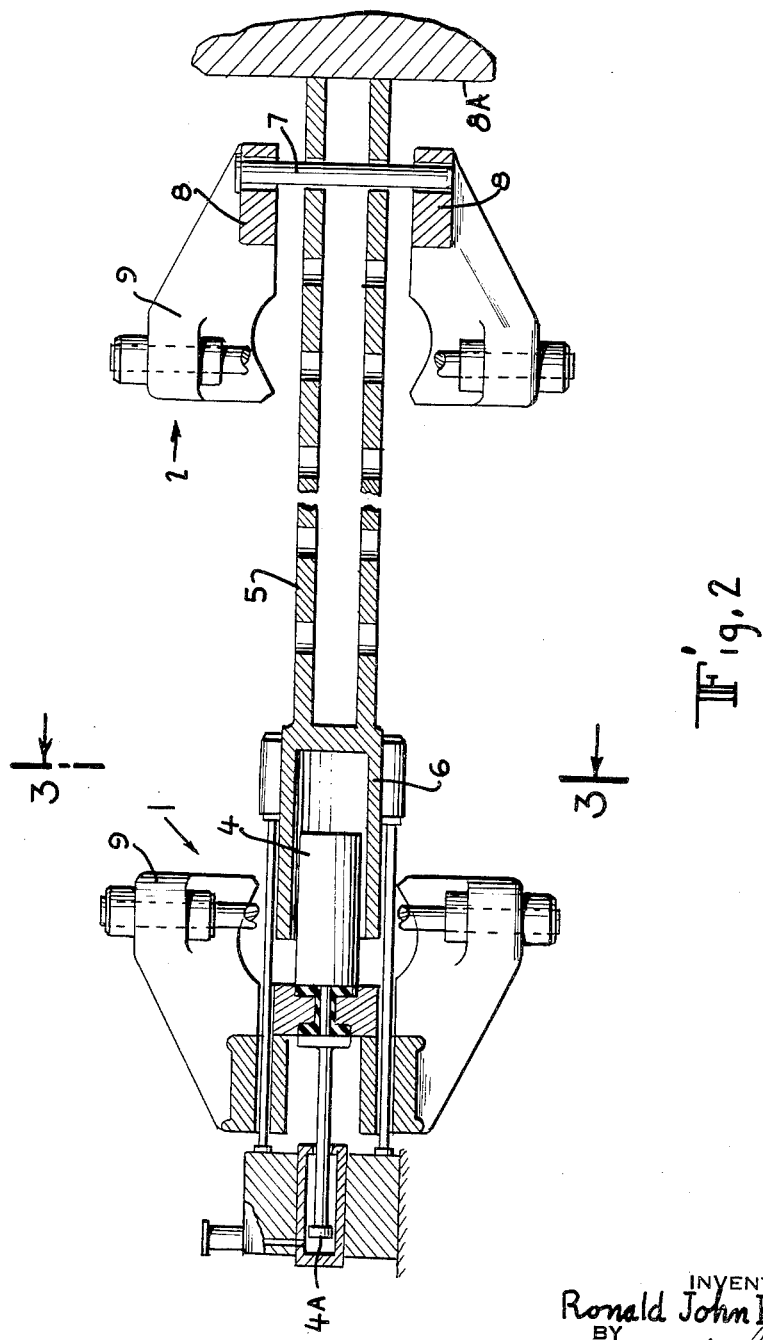
Figure 6:
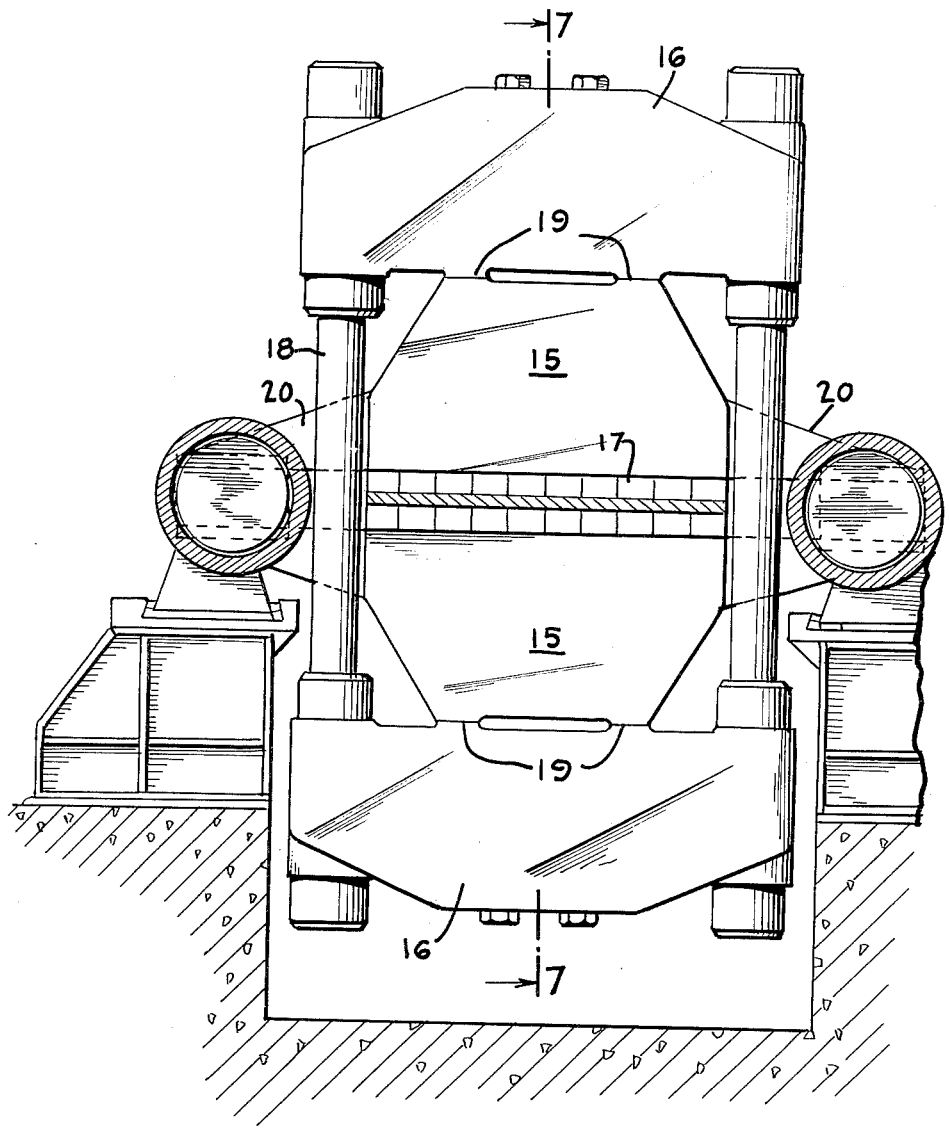
Figure 7:
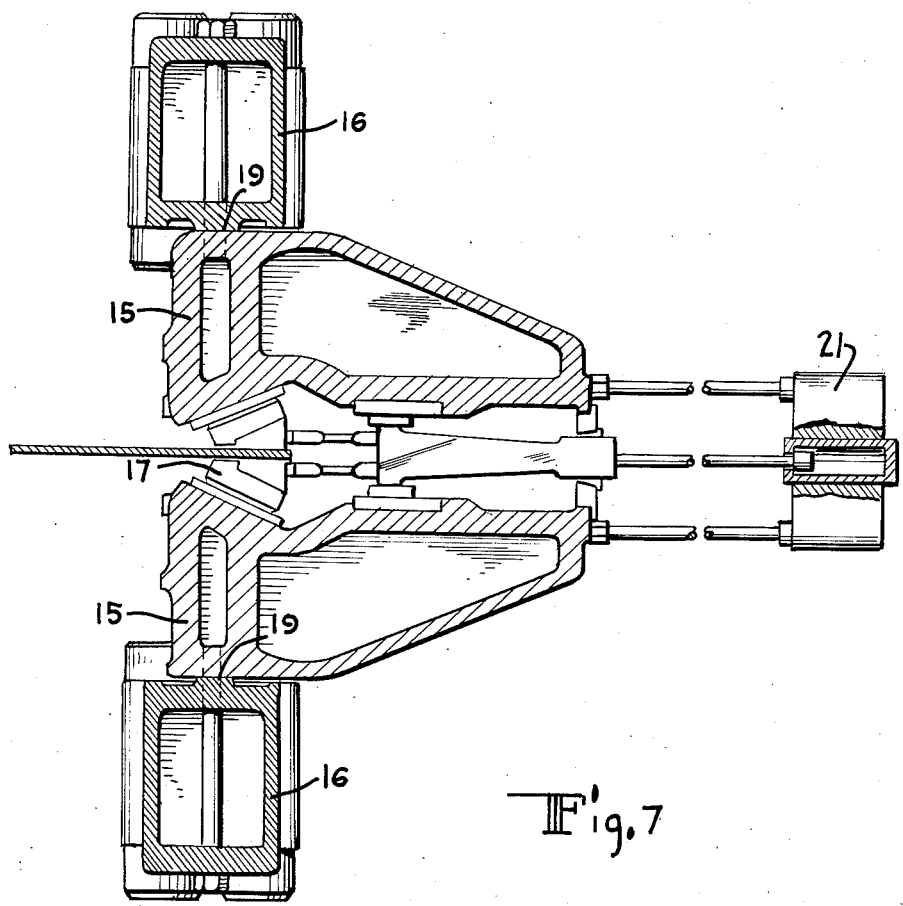
Figure 8:
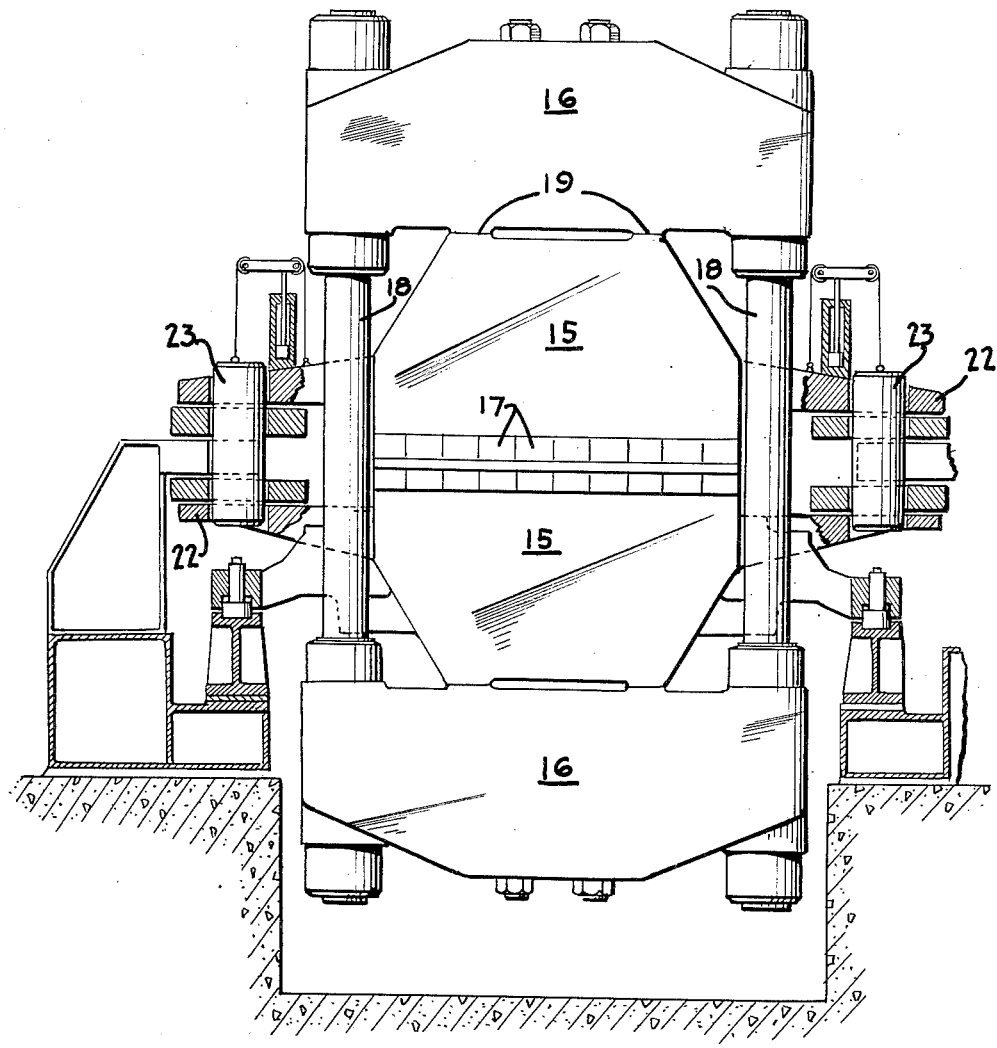

For a better understanding of the invention and to show how it may be carried into effect the same will now be described with reference to the accompanying drawings, wherein:

FIGURE 1 is a plan view partly in section of a hydraulic stretching machine incorporating gripperheads constructed in accordance with the present invention, FIGURE 2 is a side elevation partly in section of FIGURE 1, FIGURE 3 is a transverse view of a gripperhead taken on the line 3—3 of FIG. 2, FIGURE 4 is a vertical section through line 4—4 of FIGURE 3, FIGURE 5 is a transverse view partly in section of a second gripperhead according to the invention, FIGURE 6 is a transverse view partly in section of yet another type of gripperhead according to the invention, FIGURE 7 is a vertical section on line 7—7 of FIGURE 6, and FIGURE 8 is a transverse view partly in section of a further type of gripperhead according to the invention.

As shown in FIGURES 1 and 2 a typical hydraulic stretching machine for metal articles, in particular, flat metal articles, such as plates and sheets, comprises two gripperheads 1, 2 each provided with a pair of co-operating clamping jaws as will be later described. Associated with lateral extensions 3 (FIGURE 3) on gripperhead 1 are a pair of hydraulic rams 4 for supplying the required stretching force; auxiliary rams 4A are provided to impart a return stroke to the rams 4 after the stretching operation. The second gripperhead 2 similarly provided with clamping jaws is movable longitudinally of a frame comprising a pair of parallel compression members 5 which are united at one end integrally with the main cylinders 6 housing the hydraulic rams 4. As shown, the head 2 may be secured in any desired position along the machine frame by means of locking rods 7 (FIGURE 5), each engaging lateral extensions 8 on the gripperhead and passing through a pair of aligned holes formed in said compression members. The compression members at their ends remote from the hydraulic gripperhead 1 are anchored to the machine frame 8A.

In the constructional example illustrated in FIGURES 3 and 4 the gripper head 1 comprises a pair of crossbeam units 9 for associated gripping jaws 10. The term "jaw" is intended to cover that construction, as mentioned in the opening paragraphs of the specification, which comprises a number of wedge-shaped jaw sections arranged side by side. Both crossbeam units are arranged in the vertical transverse plane through the jaw 10 and extend across the width of the jaws and therebeyond so that they project at 9A with their ends over the ends of the jaws in the direction of the vertical transverse plane through the jaws. Tie-rods 11 formed by vertical columns with nuts threaded on their ends extend between and connect corresponding ends of the two crossbeam units. As shown in FIGURE 4 a hydraulic unit 12 fitted to the rear portion of the gripperhead 1 by means of tie-rods 13 is arranged to operate longitudinally displaceable connecting links 14 coupled to said jaw sections. The arrangement is such that said jaw sections may be opened or closed independently of the movement of the gripperhead, operation of the hydraulic unit causing displacement of said wedge-shaped jaw sections on their inclined bearing surfaces to release or grip an article.

It will be seen that the movable gripperhead 2 illustrated in FIGURE 5 is of similar construction to the aforementioned ram driven gripperhead 1 and in the circumstances like parts have been designated with the same reference numerals.

The crossbeam units 9 and the tie-rods 11 form together a closed rectangular frame structure which is situated in the vertical transverse plane through the jaws 10 and inside of which frame structure the jaws are accommodated. The separating forces set up during a stretching operation are then transmitted to the tie-rods 11 without creating any bending moments which tend to open up the gap between the jaws as in the case of the aforementioned C-shaped gripperhead.

The only bending moments produced in the present structure are those in the vertical transverse plane through the jaws 10. These bending moments result in deflections of the jaws along a curve having the characteristics of the elastic line of a beam supported at both its ends and carrying therebetween a uniform load, the supports being represented here by the tie-rods 11. The distance from a tie-rod passing through an extension of a crossbeam unit of the structure according to the invention from the tie-rod passing through the other extension of that crossbeam unit may be very considerable in stretching machines adapted for handling wide and very wide flat articles and may be in the order of 10 feet or even more. The maximum deflection of the crossbeam units and also that of the jaws 10 which occurs at their respective centre under these conditions will be correspondingly large, and may exceed permissible limits.

These deflections are considerably reduced by the constructional example of ram driven gripperheads for supplying the stretching force as illustrated in FIGURES 6 and 7.

According to this second feature, each crossbeam unit is constituted by inner and outer crossbeam members 15 and 16, respectively, said members being superimposed upon each other and being arranged in the vertical transverse plane through the jaws 17. Each of the inner crossbeam members carry a jaw, and each of the outer crossbeam members extend beyond the width of these jaws at both its ends, while the tie-rods 18 are attached to these projecting ends. As illustrated, each of the inner crossbeam members 15 makes contact with an associated outer crossbeam member at two spaced-apart points 19 which are equi-distant from the vertical longitudinal medial plane through the jaws 17. As in the previous example the gripperhead is provided with lateral extensions 20 associated with hydraulic rams to effect the stretching force. The gripperhead is also provided with a hydraulic unit 21 to operate the jaw sections.

The movable gripperhead illustrated in FIGURE 8 is of similar construction to the composite gripperhead just described and in the circumstances like parts have been designated with the same reference numerals. In this case the gripperhead is provided with lateral extensions 22 and locking rods 23 to engage holes in the compression members as previously described.

Each gripperhead includes, therefore, a composite frame structure wherein each of the horizontal sides of the frame is formed by two crossbeam members in contact with each other at the two spaced-apart points 19 while the vertical sides of this frame are formed by the tie-rods 18.

The above-described contact points 19 are the only points at which the gripping and separating forces are transmitted from the inner to the outer crossbeam members. The deflections of the jaw 17 will thus form a curve having the characteristics of the elastic line of a beam supported between its ends so as to have two overhanging or cantilever portions extending between the ends and the spacing points 19. According to the width of the article to be stretched the uniform load of that beam may either extend beyond the supports 19 and over the cantilever portions, or a part thereof; or, in the case of comparatively narrow articles to be stretched, the uniform load of the beam may extend over only that portion of the beam between the supports or parts of that portion. In either case the maximum deflections of the jaws 17 will be greatly reduced because these deflections are determined by the distance of the supports 19 from each other and they will be considerably less than in the afore-described case where the jaw-carrying crossbeam units were directly attached to the tie-rods.

The optimum results, i.e., the smallest maximum deflections for a given width of an article and a given load will be obtained when the points of contact 19 between inner and outer crossbeam members 15, 16 are situated approximately in vertical longitudinal planes halfway between the middle of the jaw and its ends, or, in other words, when the distance of the points of contact from the vertical longitudinal planes through the jaw ends is approximately a quarter of the width of the jaw, and, therefore, the distance between the supporting points is approximately half the width of the jaw. However, satisfactory results can also be obtained by arranging the points of support at other distances.

To facilitate production and assembly the outer crossbeam members may be formed by a number of laminated plates or in two halves separated through the vertical centre line, said plates or halves being inter-connected by mean of transverse tie-rods or braces.

In the foregoing it is assumed that only one tie-rod is provided in respect to each end of the crossbeam units. It is to be understood that groups of two or more tie-rods can be provided instead at each end so long as the tie-rods of each group are arranged symmetrically with respect to the vertical transverse plane through the jaws which are supported in the respective crossbeam units. As previously mentioned the tie-rods may be formed by columns with nuts threaded on their ends which bear against the crossbeam. Alternatively the nuts may be dispensed with at one or both ends of a tie-rod and the tie-rod be formed there instead as a hydraulic ram which enters a cylinder filled with pressure fluid. The tie-rods may be prestressed, if desired.

The gripperhead structure according to the invention may be used with great advantage in stretching machines which have to deal with wide and very wide flat metal articles and in which, consequently, very strong stretching forces may be required. With the design according to the invention the gripperhead structures carrying the jaws will not be subjected to undue bending loads and the jaws to excessive deflections whatever the stretching force will be. It is therefore possible to make all the components of the gripperhead structures of such a size that their manufacture does not present great difficulties.

What I claim is:

1. In a hydraulic stretching machine a pair of gripperheads each comprising a supporting structure and two cooperating gripping jaws subjected to transverse separating forces set up during its stretching operation and constituted by two separate spaced apart crossbeam units of substantially equal weight, one for each gripping jaw, said crossbeam units and said jaws being arranged in superposed relationship, and said crossbeam units extending across the width of the jaws and therebeyond so that they project with their ends beyond the ends of the jaws, each crossbeam unit having inclined wedge shaped surfaces cooperating with inclined wedge shaped surfaces on the gripping jaws to cause the gripping jaws to grip a sheet therebetween by relative movement between said inclined wedge shaped surfaces, tie-rods extending between and connecting corresponding ends of the two crossbeam units so that the crossbeam units and the tie-rods form together a closed rectangular frame structure in which the jaws are accommodated, the plane of symmetry of said rectangular frame structure longitudinally of said tie-rods substantially coinciding with the plane of said transverse separating forces on said jaws tending to cause separation of said jaws, compression members at each side of said gripper heads connecting said gripperheads together and hydraulic means in said compression members to move on of said gripper heads relative to the other to stretch a sheet gripped between said gripper heads.

2. In a hydraulic stretching machine, a gripperhead according to claim 1, wherein each crossbeam unit is constituted by an inner and an outer crossbeam member arranged in superposed relationship and making contact with one another at two spaced points equi-distant from the middle of the unit, and wherein the tie-rods extend between and are anchored to the outer crossbeam members only.

3. In a hydraulic stretching machine, a gripperhead according to claim 2, wherein the two spaced points of contact between the inner and outer crossbeam members are situated in vertical longitudinal planes halfway between the middle of the jaws and their ends.

4. In a hydraulic stretching machine, a gripperhead according to claim 1, wherein groups of at least two tie-rods extend between the two crossbeam units, the tie-rods of each group being arranged symmetrically with respect to the vertical transverse plane through the jaws.

5. In a hydraulic stretching machine a pair of gripperheads each comprising a supporting structure and two cooperating gripping jaws subjected to transverse separating forces set up during a stretching operation and constituted by two separate, spaced apart substantially equal size, crossbeam units, the gripping jaws each having a series of wedgelike jaw sections provided with inclined surfaces, the crossbeam units each having inner adjacent faces which cooperate with said inclined surfaces, said crossbeam units and said jaws being arranged in superposed relationship, and said crossbeam units extending across the width of the jaws and therebeyond so that they project with their ends beyond the ends of the jaws, tie-rods extending between and connecting corresponding ends of the two substantially equal size, crossbeam units so that the crossbeam units and the tie-rods form together a closed rectangular frame structure in which the jaws are accommodated, the plane of said transverse separating forces on said jaws tending to cause separation of said jaws, substantially coinciding with the plane of symmetry of said tie-rods and hydraulic means to move said gripperheads apart to stretch a sheet gripped by said jaws.

6. In a hydraulic stretching machine, a gripperhead according to claim 5, wherein each crossbeam unit is constituted by an inner and outer crossbeam member arranged in superposed relationship and making contact with one another and wherein the tie-rods extend between and are anchored to the outer crossbeam members only.

7. In a hydraulic stretching machine, a gripperhead according to claim 5, wherein groups of at least two tie-rods extend between the two cross-beam units, the tie-rods of each group being arranged symmetrically with respect to the vertical transverse plane through the jaws.

8. In a hydraulic stretching machine, a gripperhead according to claim 5, wherein each cross-beam unit is constituted by an inner and an outer cross-beam member arranged in superposed relationship and making contact with one another at two spaced points equi-distant from the middle of the unit, and wherein the tie-rods extend between and are anchored to the outer cross-beam members only.

9. In a hydraulic stretching machine, a gripperhead according to claim 8, wherein the two spaced points of contact between the inner and outer cross-beam members are situated in vertical longitudinal planes halfway between the middle of the jaws and their ends.

10. In a hydraulic stretching machine, a pair of gripperheads each comprising a supporting structure and two cooperating gripping jaws subjected to transverse separating forces set up during a stretching operation and constituted by an upper and lower, substantially equal size, crossbeam unit, the gripping jaws each having a series of wedge-like jaw sections provided with inclined surfaces, the crossbeam units each having inner adjacent faces which cooperate with said inclined surfaces, said crossbeam units and said jaws being arranged in superposed relationship, and said crossbeam units extending across the width of the jaws and therebeyond so that they project with their ends beyond the ends of the jaws, tie-rods extending between and connecting corresponding ends of the upper and lower, substantially equal size, crossbeam units so that the crossbeam units and the tie-rods form together a closed rectangular frame structure in which the jaws are accommodated, the upper and lower crossbeam units being of substantially equal weight, the plane of said transverse separating forces on said jaws tending to cause separation of said jaws, substantially coinciding with the plane of symmetry of said tie-rods and hydraulic means to move said gripperheads apart to stretch a sheet gripped by said jaws.

References Cited in the file of this patent

UNITED STATES PATENTS

| | | |
|---|---|---|
| 210,107 | Fairbanks | Nov. 19, 1878 |
| 1,149,518 | Holmes | Aug. 10, 1915 |
| 1,219,593 | Scott | Mar. 20, 1917 |
| 1,742,664 | Northern | Jan. 7, 1930 |
| 1,847,620 | Miller | Mar. 1, 1932 |
| 2,042,955 | Muntz | June 2, 1936 |
| 2,075,968 | Von Heydekampf | Apr. 6, 1937 |
| 2,218,503 | Brooks | Oct. 22, 1940 |
| 2,352,442 | Loewy et al. | June 27, 1944 |
| 2,522,319 | Tinley | Sept. 12, 1950 |
| 2,608,731 | Summers | Sept. 2, 1952 |
| 2,637,895 | Blaton | May 12, 1953 |
| 2,708,363 | Nass | May 17, 1955 |
| 2,852,062 | Lorant | Sept. 16, 1958 |

FOREIGN PATENTS

| | | |
|---|---|---|
| 739,291 | Great Britain | Oct. 26, 1955 |

OTHER REFERENCES

Pages 229–241 of "The Emery System," a publication received in Division 36, on February 11, 1937.